Oct. 16, 1945.  F. B. HALE ET AL  2,386,792
APPARATUS FOR PRODUCING FIBROUS FILTERS
Filed March 30, 1931  2 Sheets-Sheet 1

Frank B Hale
Oliver I Gaines
INVENTORS

BY

ATTORNEY.

Frank B Hale
Oliver J Gaines
INVENTORS

Patented Oct. 16, 1945

2,386,792

UNITED STATES PATENT OFFICE 2,386,792

APPARATUS FOR PRODUCING FIBROUS FILTERS

Frank B. Hale and Oliver I. Gaines, Edgewood Arsenal, Md., assignors to Patrick J. Hurley, Secretary of War of the United States, as trustee for the United States of America Application March 30, 1931, Serial No. 526,440

3 Claims. (Cl. 92—56)

(Granted under the act of March 3, 1883, as amended April 30, 1928; 370 O. G. 757)

The invention described herein may be manufactured and used by or for the Government for governmental purposes, without payment to us of any royalty thereon.

This invention relates to filters and more particularly to apparatus for the manufacture of sucked on filters for use in gas mask canisters.

Heretofore suction machines for the manufacture of filters have not been sufficiently constant and automatic in their operation as to insure the degree of duplication required to make repeatedly such a quality of filters as will suffice the requirements for use in gas masks and similar devices. The filters produced by the suction machines heretofore employed have not been particularly adaptable for use in gas masks where such qualities as small area, low resistance to the passage of air, and a degree of porosity capable of excluding the passage of extremely small liquids or solid particles to the lungs of the wearer of a gas mask equipped with such a filter are essential.

An object of this invention is to provide apparatus for the production of filters which overcome the prior art disadvantages.

Another object of this invention is to provide apparatus automatic in its operation for the production of sucked on filters.

Yet another object of this invention is to provide apparatus for producing sucked on filters of a predetermined quality.

Still another object of this invention is to provide an apparatus for producing a filter of uniform quality.

With these and other objects in view, which may be incident to our improvements, the invention consists in the parts and combinations to be hereinafter set forth and claimed with the understanding that the several necessary steps and elements comprising our invention may be varied in construction, proportion and arrangement without departing from the spirit and scope of the appended claims.

In accordance with the present invention, fibrous material of the type suitable for forming a filter is deposited on a mandrel by reducing the pressure within the mandrel. The mandrel is adapted to be rotated while in the suspension and while partially submerged in the suspension. After a layer of fibrous material of a predetermined thickness is deposited on the mandrel it is removed from the suspension of fibrous material and subjected to an external pressure.

In order to make our invention more clearly understood we have shown in the accompanying drawings, means for carrying the same into practical effect without limiting the improvements in their useful applications to the particular construction which, for the purpose of explanation have been made the subject of illustration.

Figures 1, 2:
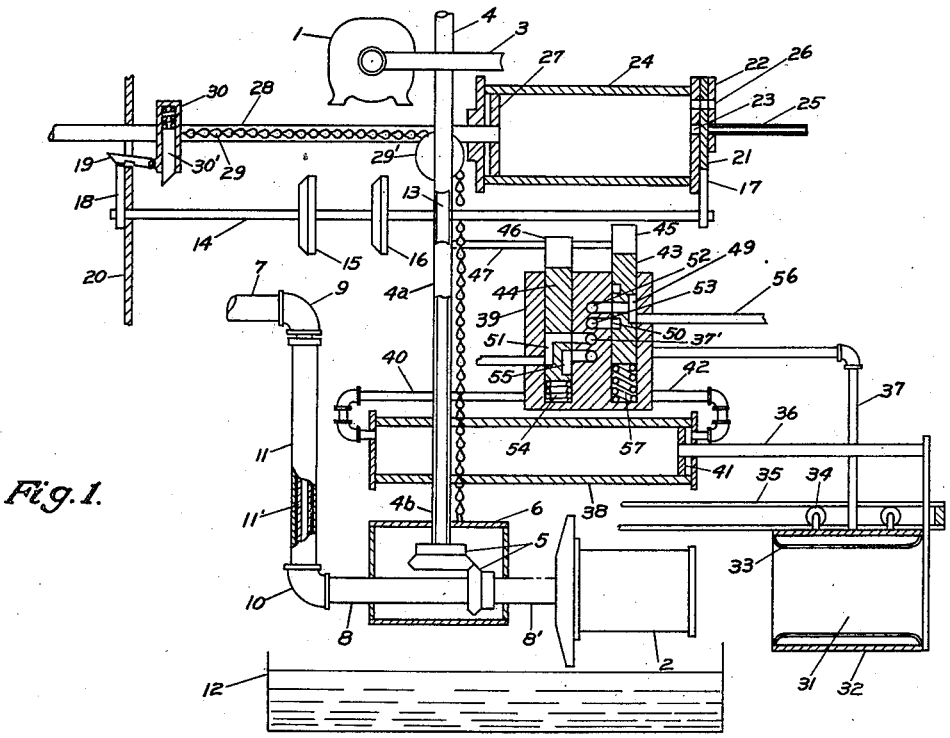
Figure 1 is a partly diagrammatic elevational view, with certain parts shown in vertical section, of an apparatus suitable for carrying out the present invention.
Figure 2 shows the raising and lowering means of the apparatus of Figure 1 when the mandrel is in a lowered position.

Referring to Figure 1, a motor or any suitable source of power 1 revolves a perforated mandrel 2 through a worm gear 3, a worm shaft 4 and a set of bevel gears 5 enclosed in a water-tight casing 6.

Shaft 4 connecting the worm gear 3 with the bevel gear 5 comprises two sections 4a and 4b so connected as to permit axial movement between the two sections. This construction permits the lower section 4b to be raised and lowered without interfering with the position of the worm gear 3.

Extending through the walls of the housing 6 is a tubular shaft 8 on which is mounted the mandrel 2 connected to shaft 4 by means of beveled gears 5. Tubular shaft 8 is suitably connected by means of the elbow 10 with the section of pipe 11 which is slidably mounted on a pipe 11' connected by an elbow 9 to a conduit 7 communicating with a suitable source of vacuum.

The sliding joint will permit movement of the pipe 11 in the vertical plane when the mandrel 2 is being lowered into or raised from a fluid medium containing fibrous material. When the shaft 8 is in the form of a tube extending through the walls of the casing 6, it may be rotatably connected to the elbow 10 by any suitable construction (not shown). If desired however, the tube 8 may comprise a portion fixed to elbow 10 and a rotary portion 8' carrying the mandrel and one of the bevel gears 5. In this instance the joint between the fixed and rotary sections of tube 8 may be within the casing 6. It is to be clearly understood that while we have shown a particular structure for connecting a source of vacuum to the mandrel other means may be resorted to without departing from the scope of the present invention.

Positioned below the mandrel 2 and water-tight casing 6 is a suitable container 12 in which the liquid medium containing a suspension of fibrous material is held. The quantity of liquid medium in the container depends upon the particular operation and it may be either completely filled or filled to any desired level. The container 12 for the fluid medium is of such size that the mandrel 2, water-tight casing 6, and the horizontal section of vacuum pipe 8 may be either wholly or partly immersed in the liquid contained therein.

In order to raise and lower the mandrel to the desired position, suitable mechanism has been shown in the drawings. This mechanism comprises a piston 27, slidably mounted in a cylinder 24. Piston rod 28 extends through a suitable opening in one end of the cylinder and is connected by means of a chain 29 with the fluid tight casing 6. Chain 29 which is attached to the piston rod 28 and gear casing 6 passes over a suitable pulley or sheave 29'. Mounted on piston rod 28 is a suitable stop 30 adapted to limit the movement of the piston rod the purpose of which will hereinafter appear.

The stop 30 is provided with a suitable spring actuated member 30' capable of axial movement with respect to the walls of the stop 30, the purpose of which will hereinafter appear.

A slide valve casing 22 is provided at the inlet end of the cylinder 24. The casing 22 comprises a slidable valve body 21 adapted to be actuated by suitable means hereinafter appearing. A fluid pressure inlet port 23 is provided in the slide valve casing and in alignment with a suitable pressure conduit 25 for applying external pressure to the piston 27 when in the inlet end of the cylinder. There is also provided a port 26 communicating with the atmosphere or exhaust device for relieving the pressure within the cylinder when the piston 27 is at the end of the stroke as viewed in Figure 1.

As hereinbefore pointed out it is desirable to maintain the mandrel 2 within the suspension of filter forming material a definite time and then to partially remove it from the suspension for another period of time before completely removing it therefrom.

Coacting with shaft 4 by means of a suitable worm gear 13 is a cam shaft 14. Mounted on the cam shaft 14 are disks 15 and 16 with suitable slots cut therein, the reasons for which will hereinafter appear. On the same cam shaft 14 are mounted a cam 17 and a cam or trip arm 18. As shown in Figure 1, cam 18 which rotates on cam shaft 14 driven by the worm gear 13 is in a position so as to lift latch 19 from the stationary frame 20 of the machine. Also cam 17 rotating on the cam shaft has lifted valve body 21 in the slide valve casing 22 closing a fluid pressure inlet port 23, and opening port 26 placing the interior of the cylinder 24 in communication with the atmosphere or any suitable exhaust device thereby relieving the pressure on piston 27. The relief of pressure from the cylinder 27 and the removal of latch 19 from engagement with the frame 20 permits mandrel 2 together with its associated mechanism to drop.

In the moving of the mandrel to its lowered position, piston 27 will have moved to the valve end of the cylinder as shown in Figure 2. During this movement the spring pressed member 30' carried in the stop 30 will have passed the disks 15 and 16. Upon the piston reaching the valve end of the cylinder, cam 17 will have moved to close the port 26 in valve 22 and to open the fluid pressure inlet port 23 to the pressure pipe 25. Upon the admission of fluid under pressure to cylinder 24 the piston will be removed from the valve end of the cylinder and this will force stop 30 hard against notched disk 16.

Figure 3:
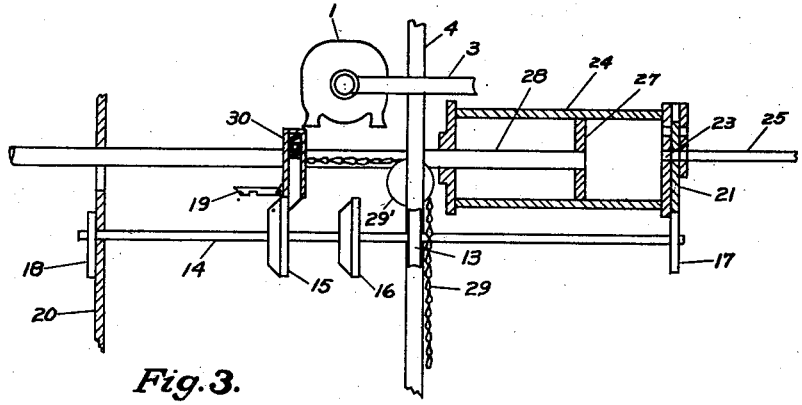
Figure 3 shows the raising and lowering means of the apparatus of Figure 1 when the mandrel is partially raised.
Figure 4:
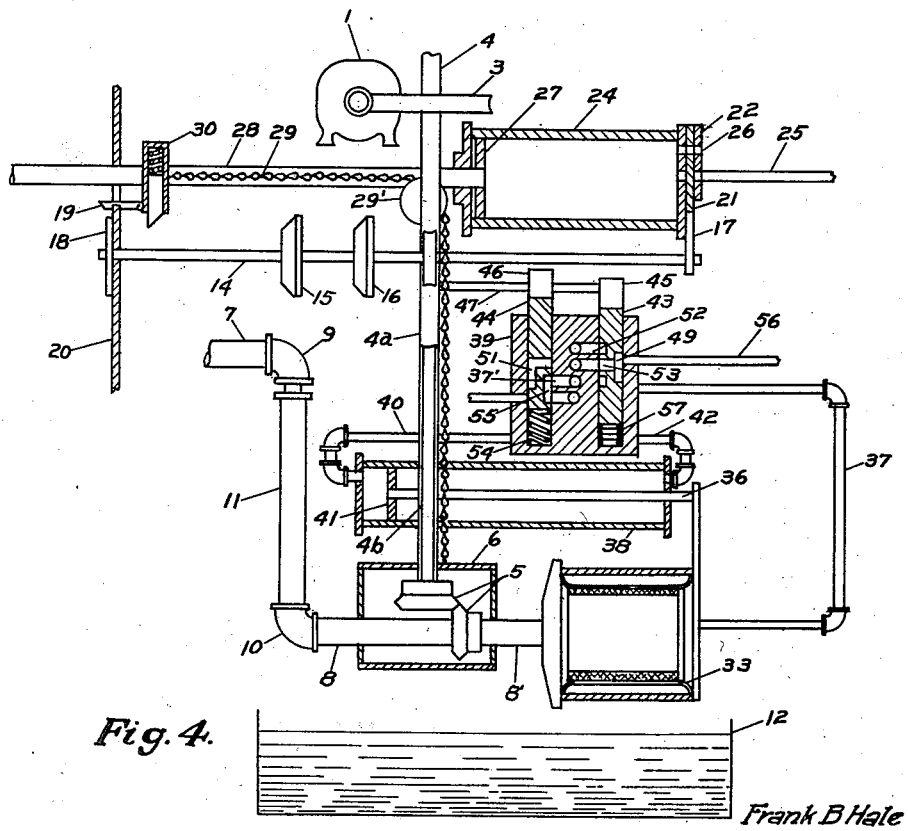
Figure 4 is a view somewhat similar to Figure 1 showing the pressing means of the apparatus of Figure 1 in position for applying pressure to the exterior of the mandrel.

Further rotation of cam shaft 14 and consequently notched disk 16 will bring a radial slot (not shown) in disk 16 into a position to permit the stop 30 to pass therethrough. After passing through the slot in disk 16, the stop will then be forced hard against disk 15 as viewed in Figure 3. The horizontal movement of the stop 30 together with the chain 29 will have raised the mandrel from the fluid medium containing a fibrous material a definite distance, at which point it remains for a definite period of time depending on the speed of rotation of the cam shaft and the setting of the notched disk. Still further rotation of the cam shaft will allow stop 30 to pass through a radial slot (not shown) in disk 15 permitting the piston rod 28 and associated mechanism to be moved to the extreme position viewed in Figures 1 and 4. This will have moved the mandrel 2 to a raised position.

Manifestly the number of disks on the cam shaft 14 and the position of the disk on the shaft depend on the length of time the mandrel should be immersed or partially immersed in the fluid medium and it is to be clearly understood that this invention is not limited to any special number of disks nor any particular arrangement.

After the mandrel is removed from the suspension, excess moisture may be drawn from the mandrel and discharged into the vacuum system. The mandrel 2 now having been raised from the submerged or partially submerged position is in line with and ready to receive press 31, and pressure therefrom to increase the density of the filter and remove the remaining excess liquid.

In order to more firmly pack the filter on the mandrel we have found that by applying a surface of flexible material, such as rubber, against the filter and then subjecting the outside of the flexible member to fluid pressure that better results may be obtained.

The press 31 has a brass or other suitable metal cylinder 32 with the cylindrical diaphragm 33 placed inside the cylinder and securely sealed to the end thereof. The press is mounted on rollers 34 and adapted to travel along suitable tracks 35. The movement of the press along the track 35 is controlled by the action of a piston rod 36 attached to the press by suitable means not shown. The rubber diaphragm 33 in the press may either be drawn to the inner wall of the cylinder 32 or pressed on to the outer surface of the filter depending on whether a fluid is forced in or withdrawn from the space between the mandrel and rubber cylinder. Fluid is conveyed to and from the press through the flexible conduit 37.

Press 31 is moved to the extremity of travel as shown in Figure 1 by means of fluid pressure applied to a piston 41 in cylinder 38 through double acting slide valve 39 and a suitable pipe 40. In this instance fluid entering through conduit 56 passes through the port 49 in the valve 43 into the port 52 communicating with the conduit 40. Fluid exhausted from the cylinder 38 through conduit 42 flows through port 53 and thence through port 50 in valve 43 from which it is exhausted.

The horizontal movement of the press 31 to a position surrounding the mandrel 2 is accomplished by actuation of valve 43 by a suitable cam 45 and opening 57 so as to move the valve 43 to effect a connection between the fluid pressure conduit 56 and the port 53 communicating with conduit 42 and to place port 52 in communication with the atmosphere or a suitable exhaust receptacle.

Cams 45 and 46 are suitably mounted on a cam shaft 47 provided with suitable gearing adapted to associate the shaft 47 with shaft 4 or cam shaft 14. In the position shown in Figure 1 a source of vacuum (not shown) is connected to the press 31 through port 51 in slide 44 and subsequently through port 37' and the flexible connection 37. The action of vacuum in this instance holds the diaphragm 33 in press 31 snugly against the inner wall of the press cylinder.

Cam 46 has held slide 44 stationary until the press has moved to a position surrounding the mandrel having a fibrous material deposited thereon. After the press is positioned on the mandrel, pressure is applied thereto so as to press the fibrous material tight on the mandrel. In this action cam 46 and spring 54 actuate slide 44 closing port 51 and opening port 55 thereby connecting the source of pressure to the space between the rubber diaphragm and the cylinder of the press.

On completion of the pressing operation the cams 45 and 46 again force the slides 43 and 44 of the valve slide 39 to the position shown in Figure 1 so as to apply a vacuum to the space between the press and diaphragm and then remove the filter from the mandrel and repeat the operation.

It will be appreciated that by suitably interconnecting the cam shaft 14 and the cam shaft 47 and positioning the disks 15 and 16 and the cams 17 and 18 on shaft 14 and the cams 45 and 46 on the shaft 47, the operation of the machine can be made entirely automatic. For instance when the mechanism is properly adjusted the mandrel may be lowered into the suspension, permitted to remain there for a definite period of time, partially removed from the suspension, allowed to remain in this position for a predetermined period of time and then raised to the uppermost position.

After reaching the uppermost position, valves 43 and 45 will be operated to bring about the movement of the press to a position surrounding the mandrel and the fibrous material deposited thereon. When in this position pressure can be applied to the press for a definite period of time and then the pressure released and a suction appiled to withdraw the diaphragm from the pressed filter. Subsequently the press is removed to the extreme position shown in Figure 1 and the filter removed from the mandrel. The mandrel and associated mechanism may then be allowed to drop into the receptable 12. It is obvious that with the structure shown that the foregoing cycle may be continuously repeated.

The present invention overcomes the obstacles heretofore encountered in the manufacture of gas mask filters and provides a machine which is capable of being automatically operated and serves adequately to continuously produce filters of a uniform quality.

While we have shown and described the preferred embodiment of our invention, we wish it to be understood that we do not confine ourselves to the precise details of construction herein set forth, by way of illustration, as it is apparent that many changes and variations may be made therein by those skilled in the art, without departing from the spirit of the invention or exceeding the scope of the appended claims.

We claim:

1. An apparatus for producing sucked-on filters for use in gas mask canisters comprising in combination a mandrel mounted on a shaft passing through the axis of rotation of said mandrel, means for revolving said shaft to revolve the mandrel about its axis of rotation, means for reducing pressure within the mandrel to deposit material on the outer surface thereof, a tank containing a suspension of fibrous material, means for vertically lowering the mandrel into said tank until the mandrel is submerged and for alternatively vertically raising the mandrel out of said tank, means for holding said mandrel in a partly submerged position, a compression cylinder cooperating with said mandrel and mounted for reciprocal motion alternatively to a position surrounding said mandrel when the mandrel is completely out of the tank and to a position away from said mandrel, said compression cylinder including a fluid-pressure-actuated diaphragm mounted therein for surrounding and compressing all parts of the filter formed on said mandrel when the mandrel is completely removed from said tank, a source of fluid pressure for exerting pressure on said diaphragm, and actuating means for said compression cylinder to produce said reciprocal motion thereof.

2. An apparatus for producing sucked-on filters for use in gas mask canisters comprising in combination a mandrel mounted on a shaft passing through the axis of rotation of said mandrel, a plurality of gears on said shaft, rotating means associated with said shaft for revolving the mandrel on said shaft and about its axis of rotation, means for vertically raising and lowering said mandrel into and out of a tank containing fibrous material, means for reducing pressure within said mandrel to deposit material on the outer surface thereof, a compression cylinder cooperating with said mandrel and mounted for reciprocal motion alternately to a position surrounding said mandrel and to a position away from said mandrel, said compression cylinder including a fluid-pressure-actuated diaphragm mounted therein for surrounding and compressing all parts of the filter formed on said mandrel, a source of fluid pressure for exerting pressure on said diaphragm, and actuating means for said compression cylinder to produce said reciprocal motion thereof.

3. An apparatus for producing sucked-on filters for use in gas mask canisters comprising in combination a mandrel mounted on a shaft passing through the axis of rotation of said mandrel; a plurality of gears thereon; rotating means associated with said shaft for revolving the mandrel on said shaft and about its axis of rotation; means for vertically raising and lowering said mandrel into and out of a tank containing fibrous material, said means comprising a piston, a rod actuated by said cylinder, a chain connected at one end to said rod, a casing connected to the other end of said chain and an axle passing through said casing and vertically movable with said casing member, said mandrel being mounted upon the axle at one end thereof; means for reducing pressure within said mandrel to deposit material on the outer surface thereof; a compression cylinder cooperating with said mandrel and mounted for reciprocal motion alternatively to a position surrounding said mandrel when the mandrel is out of the tank and to a position away from said mandrel, said cylinder including a fluid-pressure-actuated diaphragm mounted therein for surrounding and compressing all parts of the filter formed on said mandrel when the mandrel is completely removed from the tank, a source of fluid pressure for exerting pressure on said diaphragm when the compression cylinder surrounds said mandrel; and actuating means for said compression cylinder to produce said motion thereof, said actuating means comprising an actuating piston and a rod reciprocated by said actuating piston, said rod being attached at the other end thereof to said compression cylinder.

FRANK B. HALE.
OLIVER I. GAINES.